United States Patent [19]

Fieldhouse et al.

[11] 4,327,064

[45] Apr. 27, 1982

[54] SOLUTION POLYMERIZATION OF CYCLIC DICHLOROPHOSPHAZENE OLIGOMERS IN CYCLOALIPHATIC SOLVENTS

[75] Inventors: John W. Fieldhouse, Mogadore; Steven L. Fenske, Uniontown, both of Ohio

[73] Assignee: The Firestone Tire & Rubber Company, Akron, Ohio

[21] Appl. No.: 174,765

[22] Filed: Aug. 4, 1980

[51] Int. Cl.$^3$ .............................................. C01B 25/10
[52] U.S. Cl. ................................................... 423/300
[58] Field of Search ........................................ 423/300

[56] References Cited

U.S. PATENT DOCUMENTS

| | | | |
|---|---|---|---|
| 4,123,503 | 10/1978 | Snyder et al. | 423/300 |
| 4,137,330 | 1/1979 | Prichard et al. | 423/300 |
| 4,139,598 | 2/1979 | Reynard et al. | 423/300 |
| 4,225,567 | 9/1980 | Halasa et al. | 423/300 |
| 4,226,840 | 10/1980 | Fieldhouse et al. | 423/300 |
| 4,242,316 | 12/1980 | Sinclair | 423/300 |

*Primary Examiner*—O. R. Vertiz
*Assistant Examiner*—Wayne A. Langel

[57] ABSTRACT

Substantially linear polydichlorophosphazene polymers having a degree of polymerization of from 20 to 50,000 are prepared by an improved solution polymerization process which involves the polymerization of substantially pure cyclic dichlorophosphazene oligomers represented by the formula $(NPCl_2)_n$, in which n is from 3 to 7, in cycloaliphatic solvents in the presence of a boron trihalide catalyst or a complex of a boron trihalide with an oxygenated phosphorus compound.

The process provides for the production of substantially gel free linear polydichlorophosphazene polymer, improved polymerization rates and easier handling of the polymerizate for subsequent derivatization reactions.

9 Claims, No Drawings

SOLUTION POLYMERIZATION OF CYCLIC DICHLOROPHOSPHAZENE OLIGOMERS IN CYCLOALIPHATIC SOLVENTS

BACKGROUND OF THE INVENTION

The invention relates to improvements in the solution polymerization of low molecular weight cyclic dichlorophosphazene oligomers to higher molecular weight substantially linear polydichlorophosphazene polymers. More particularly, the invention relates to the use of cycloaliphatic solvents and certain boron catalysts in the solution polymerization of substantially pure cyclic dichlorophosphazene oligomers to form substantially linear, substantially gel free, polydichlorophosphazene polymers.

The polymerization of low molecular weight cyclic dihalophosphazenes such as $(NPCl_2)_3$ or $(NPCL_2)_4$ to higher molecular weight linear polydihalophosphazene polymers is well known in the art.

Prior processes for polymerizing such cyclic dihalophosphazenes involved the uncatalyzed or catalyzed thermal polymerization of such cyclic dihalophosphazenes principally employing a bulk process without solvents. Such prior bulk processes are described in U.S. Pat. No. 3,370,020 to Allcock, et al. issued Feb. 20, 1968; U.S. Pat. No. 3,515,688 to Rose issued June 2, 1970; U.S. Pat. No. 4,005,171 to Reynard, et al. issued Jan. 25, 1977; U.S. Pat. No. 4,123,503 to Snyder, et al. issued Oct. 31, 1978 and in the publication entitled "Phosphorus-Nitrogen Compounds" by H. R. Allcock published in Academic Press, New York, N.Y. 1972.

While such prior bulk polymerization processes provided for the conversion of cyclic dihalophosphazenes to linear high molecular weight polydihalophosphazene polymers, they exhibited several significant disadvantages. Thus, for example, the uncatalyzed bulk polymerization process required relatively high polymerization temperatures, e.g., 200° to 300° C. and lengthy polymerization times (i.e., slow conversion rates). As will be apparent, such high temperatures and lengthy polymerization times require significant amounts of energy. Moreover, these prior bulk polymerization processes often resulted in the formation of gelled or partially gelled polydichlorophosphazene polymers which were insoluble in many conventional solvents and therefore could not readily be derivatized to produce useful polymeric products such as those described in, for example, U.S. Pat. Nos. 3,370,020; 3,515,688; 3,700,629 and 3,856,712.

In addition, bulk processes for preparing polydihalophosphazene polymers lead to difficult and often complex problems in transferring the molten polymer from the polymerization vessel to a reactor for subsequent derivatization procedures of the type described in the aforementioned patents.

In view of the foregoing problems associated with bulk polymerization processes, those active in the polyphosphazene polymer field have increasingly turned their attention to solution polymerization processes. One such solution polymerization process is described in U.S. Pat. No. 4,005,171 to Reynard, et al. issued Jan. 25, 1977. As described in that patent, cyclic dihalophosphazenes are solution polymerized in nitro or halo aromatic solvents such as nitrobenzene, chlorobenzene, 1,2-dichlorobenzene, 1,2,4-trichlorobenzene, o- and m-nitrotoluene and the like. While the solution polymerization process described in the patent is advantageous in several respects, it also suffers significant disadvantages. Thus, the aromatic solvents employed in the process are not sufficiently inert and many react with the polydichlorophosphazene polymers at higher temperatures. In addition, the removal of aromatic solvents from the finished polymer and recovery of such solvents for reuse presents further problems.

Another approach to such solution polymerization processes is described in copending application Ser. No. 739,212 of Halasa, et al. filed Nov. 5, 1976 now U.S. Pat. No. 4,225,567, commonly assigned to applicants' assignee herein. As described in that application, the process involves the solution polymerization of cyclic chlorophosphazenes in aromatic hydrocarbon or cycloaliphatic hydrocarbon (including cyclohexane) solvents in the presence of small amounts of modifiers selected from sulfur, sulfur compounds or sulfur donating compounds.

While the process disclosed in copending application Ser. No. 739,212 is advantageous in many respects and permits the solution polymerization of cyclic chlorophosphazenes to higher molecular weight linear polydichlorophosphazene polymer without the formation of appreciable amounts of gel, it also suffers from certain disadvantages. Thus, as disclosed in the copending application, it is necessary to employ a sulfur modifier along with the aromatic hydrocarbon or cycloaliphatic hydrocarbon solvent in order to prevent the formation of gelled polymer. However, the use of the sulfur modifier leads to other problems. Hence, the use of a sulfur modifier can lead to the possibility of sulfur being incorporated into the polyphosphazene polymer backbone which in turn can adversely affect the thermal stability of the finished polymer.

SUMMARY OF THE INVENTION

In accordance with this invention, a simplified solution polymerization process for preparing linear, high molecular weight, ungelled polydichlorophosphazene polymers is provided which obviates or at least greatly minimizes the disadvantages encountered in the prior solution polymerization processes.

The process involves the polymerization of substantially pure cyclic dichlorophosphazene oligomers represented by the formula $(NPCl_2)_n$, in which n is from 3 to 7, in a cycloaliphatic hydrocarbon solvent in the presence of a boron trihalide catalyst or a catalyst complex of a boron trihalide with an oxygenated phosphorus compound.

The process provides for the production of substantially gel free linear polydichlorophosphazene polymers and features lower energy requirements during polymerization due to bulk viscosity reduction, faster rates of polymerization due to better heat transfer characteristics, ease of transfer of the polymerizate for subsequent derivatization reactions and reduction of time required for dissolution.

DETAILED DESCRIPTION OF THE INVENTION

Polydichlorophosphazene polymers which are prepared by the solution polymerization process of the invention are substantially linear ungelled polydichlorophosphazenes having a degree of polymerization of from 20 to 50,000. Such polymers may contain from 20 to 50,000 polymer units represented by the structure:

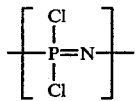

The process of the invention involves the solution polymerization of substantially pure cyclic dichlorophosphazene oligomers represented by the formula $(NPCl_2)_n$, in which n is from 3 to 7, in a cycloaliphatic hydrocarbon solvent in the presence of a boron trihalide catalyst or a catalyst complex of a boron trihalide with an oxygenated phosphorus compound at temperatures which can range from 150° C. and 300° C. and times of from 4 to 30 hours.

The cyclic dichlorophosphazene oligomers which are employed as starting materials in the process of the invention are substantially pure oligomers which are obtained by purification of crude cyclic chlorophosphazene oligomers. A variety of methods of purification are known in the phosphazene art including such methods as extraction, crystallization, distillation, saponification and hydrolysis, treatment with a Bronsted base and treatment with water. The preferred purification methods for preparing the substantially pure cyclic oligomers used as starting materials in the process of this invention are treating the crude cyclic chlorophosphazene oligomers with Bronsted bases as described in U.S. Pat. No. 3,952,086 to Fieldhouse and treatment by water washing as described in U.S. Pat. No. 4,175,113 to Fieldhouse.

As indicated, the cyclic dichlorophosphazenes which are employed in the process may be cyclic oligomers represented by the formula $(NPCl_2)_n$ in which n is an integer of from 3 to 7. Of these cyclic oligomers, the cyclic dichlorophosphazene trimer $(NPCl_2)_3$ is preferred.

Various cycloaliphatic hydrocarbon solvents may be employed as the solvent medium in the solution polymerization process of the invention. Thus, cycloaliphatic hydrocarbon solvents such as cyclohexane, cyclopentane, decahydronaphthalene (decalin), cycloheptane, methyl cyclohexane and the like may be utilized. The preferred cycloaliphatic solvent for use in the process is cyclohexane.

As indicated above, the process of the invention requires the use of a catalyst. It should be noted here that the use of a catalyst is required where a substantially pure cyclic chlorophosphazene oligomer is employed as the starting material. Prior polymerization processes often employed impure oligomers which did not require the use of catalysts. While the reason for this factor is not entirely clear, it is theorized that the impurities in the oligomers acted as catalysts. In any event, the use of such impure oligomers resulted in widely varying polymerization rates and a tendency toward gellation. Catalysts which may be employed in the process of this invention include boron trihalides such as those described in U.S. Pat. No. 4,123,503 to Snyder, et al. issued Oct. 31, 1978, the disclosure of which is hereby incorporated herein by reference. The preferred boron trihalide for use in the process of the invention is boron trichloride. A particularly preferred catalyst for use in the process of the invention is a complex of a boron trihalide with an oxygenated phosphorus compound such as that described in U.S. application Ser. No. 077,245 to Fieldhouse, et al. filed September 1979 now U.S. Pat. No. 4,226,840, commonly assigned to applicants' assignee herein, the disclosure of which is incorporated herein by reference. An especially preferred complex of the type described in the application for use in the present process is a boron trichloride-triphenyl phosphate complex.

As indicated, the polymerization temperatures employed in the process can vary over a relatively wide range, i.e., 150° C. to 300° C. However, the preferred temperature range is from 180° C. to 250° C.

The precise polymerization times will vary somewhat. This will depend on factors such as the polymerization temperature, the amount and type of polymerization catalyst and so forth. In general, polymerization times may range from 4 hours to 30 hours.

The following examples are submitted for the purpose of further illustrating the nature of the present invention and are not intended as a limitation on the scope thereof. Unless otherwise indicated, parts and percentages shown in the examples are by weight.

EXAMPLE 1

Into a small pyrex tube was charged 270 grams of purified cyclic dichlorophosphazene trimer, $(NPCl_2)_3$, and 30 grams of dry cyclohexane. The contents of the tube were cooled to $-40°$ C. in dry ice and a vacuum was placed on the tube. Then, 120 ml of dry boron trichloride was added using vacuum line techniques. The tube was sealed and heated at 200° C. for 6 hours. The resultant clear viscous solution was then treated with 400 ml of hexane to coagulate the polydichlorophosphazene polymer (hereinafter chloropolymer). The cyclohexane-hexane solution was then removed from the tube leaving the coagulated chloropolymer. Subsequently, the coagulated chloropolymer was redissolved in cyclohexane producing a 54% yield of cyclohexane soluble chloropolymer having a dilute solution viscosity (DSV) of 0.93.

EXAMPLE 2

Into a small pyrex tube was charged 24 grams of purified cyclic dichlorophosphazene trimer, $(NPCl_2)_3$, 6 grams of cyclohexane and 60 ml of boron trichloride. The contents of the tube were cooled to $-40°$ C. in dry ice and a vacuum was placed on the tube. The tube was then sealed and treated at 200° C. for 16 hours. Following the heating step, the remainder of the procedure of Example 1 was repeated resulting in the production of a 79% yield of cyclohexane soluble chloropolymer having a DSV in cyclohexane of 0.59.

EXAMPLE 3

Into a 1 gallon stainless steel stirred reactor was charged 6 lbs of purified cyclic dichlorophosphazene trimer, $(NPCl_2)_3$, and 1.5 lbs of cyclohexane. The reactor was heated at 220° C. for 3 hours. Analysis of a sample of the material in the reactor indicated a conversion to chloropolymer of 6.8%. At this time, about 3.5 to 4.0 grams of boron trichloride were added to the reactor and heating was continued. After an additional 1 hour of heating the conversion to chloropolymer was found to be 9.6%, after 6 hours 20.7% and after 20 hours 97.8%.

EXAMPLE 4

Into a 1 gallon stainless steel stirred reactor was charged 6.0 lbs of purified $(NPCl_2)_3$, 1.5 lbs of dry cyclohexane and 9.0 grams of a boron trichloride-triphenyl phosphate complex prepared in accordance with the procedure set forth in the above-mentioned application, Ser. No. 077,245. The contents of the reactor were heated at 230° C. for 17.5 hours at which time the conversion was found to be 63.4%. Heating was continued for an additional 7.5 hours (i.e., total 24.5 hours) and the conversion to chloropolymer was found to be 75.0%.

The chloropolymer was recovered from solution by coagulation with hexane, following which the cyclohexane/hexane mixture was removed from the reactor and the chloropolymer was then redissolved in cyclohexane as in Example 1 to provide a chloropolymer of 75% conversion having a DSV in cyclohexane of 0.50.

EXAMPLES 5-8

In these examples, samples of purified cyclic dichlorophosphazene trimer $(NPCl_2)_3$ were solution polymerized in various cycloaliphatic solvents in the presence of a boron trichloride-triphenyl phosphate catalyst complex. The procedure involved in these polymerization examples was substantially the same as that employed in Examples 1-4. The amounts of trimer, catalyst and type cycloaliphatic solvent were as follows:

| Ex. No. | Amount Trimer Grams | Amount Catalyst mm* | Cycloaliphatic Solvent Type | Amount/grams |
| --- | --- | --- | --- | --- |
| 5 | 30 | 0.11 | decalin | 6.00 |
| 6 | 30 | 0.11 | methylcyclohexane | 6.00 |
| 7 | 30 | 0.11 | cyclopentane | 6.00 |
| 8 | 30 | 0.11 | cyclohexane | 6.00 |

Polymerization conditions and results are shown in the Table.

TABLE

| Ex. No. | Polymerization Conditions | | % Conversion | DSV in Toluene |
| --- | --- | --- | --- | --- |
| | Temp. °C. | Time-hours | | |
| 5 | 220 | 24 | 18.2 | 0.18 |
| 6 | 220 | 24 | 37.6 | 0.68 |
| 7 | 220 | 24 | 25.1 | 0.61 |
| 8 | 220 | 24 | 35.7 | 0.72 |

What is claimed is:
1. A solution polymerization process for producing substantially linear ungelled polydichlorophosphazene polymers having a degree of polymerization of from 20 to 50,000 which comprises:
   (a) polymerizing substantially pure cyclic oligomers represented by the formula $(NPCl_2)_n$, in which n is from 3 to 7, in solution in a cycloaliphatic hydrocarbon solvent at a temperature of from about 150° C. to about 300° C. for a period of from 4 to 30 hours in the presence of a catalyst selected from the group consisting of boron trihalides and complexes of boron trihalides with oxygenated phosphorus compounds; and
   (b) recovering the resultant polymer.
2. The process of claim 1 wherein said cyclic oligomer is $(NPCl_2)_3$.
3. The process of claim 1 wherein said cycloaliphatic hydrocarbon solvent is selected from the groups consisting of cyclohexane, methyl cyclohexane, decalin, cyclopentane and cycloheptane.
4. The process of claim 1 wherein said cycloaliphatic solvent is cyclohexane.
5. The process of claim 1 wherein said catalyst is a boron trihalide.
6. The process of claim 5 wherein said boron trihalide is boron trichloride.
7. The process of claim 1 wherein said catalyst is a complex of a boron trihalide with an oxygenated phosphorous compound.
8. The process of claim 7 wherein said complex is a boron trichloride-triphenylphosphate complex.
9. The process of claim 1 wherein said temperature is from 180° C. to 250° C.

* * * * *